July 16, 1929.  W. W. GURNEY ET AL  1,721,017
MACHINE FOR MAKING SILO STAVES
Filed June 25, 1928    4 Sheets-Sheet 1
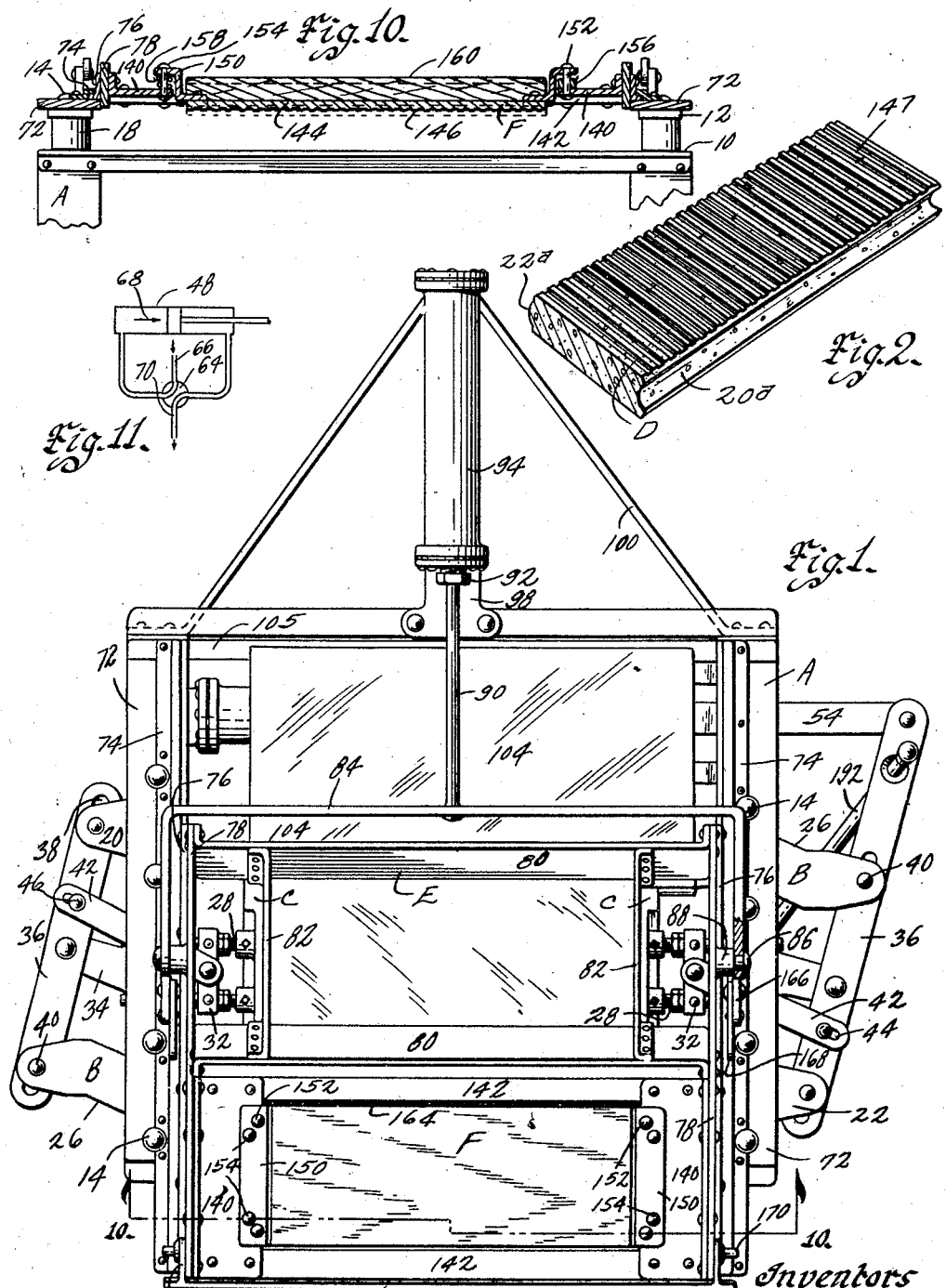

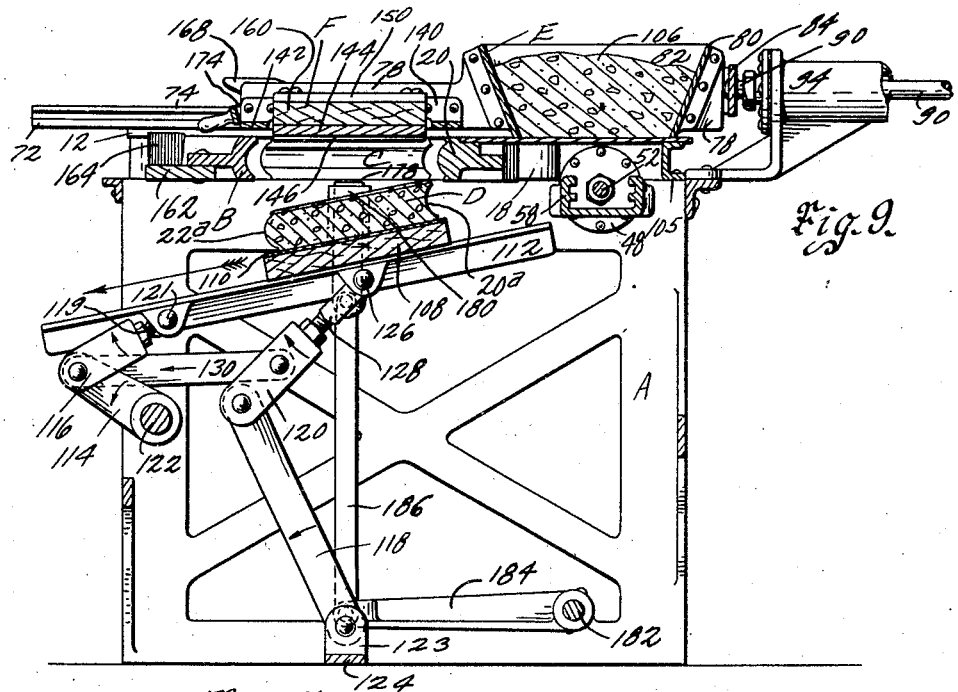
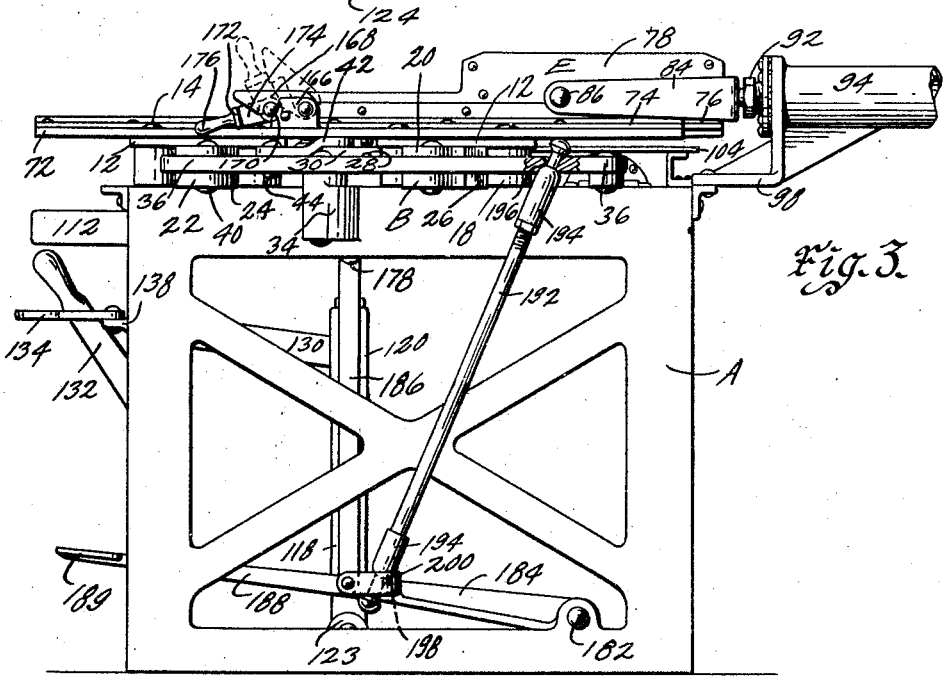

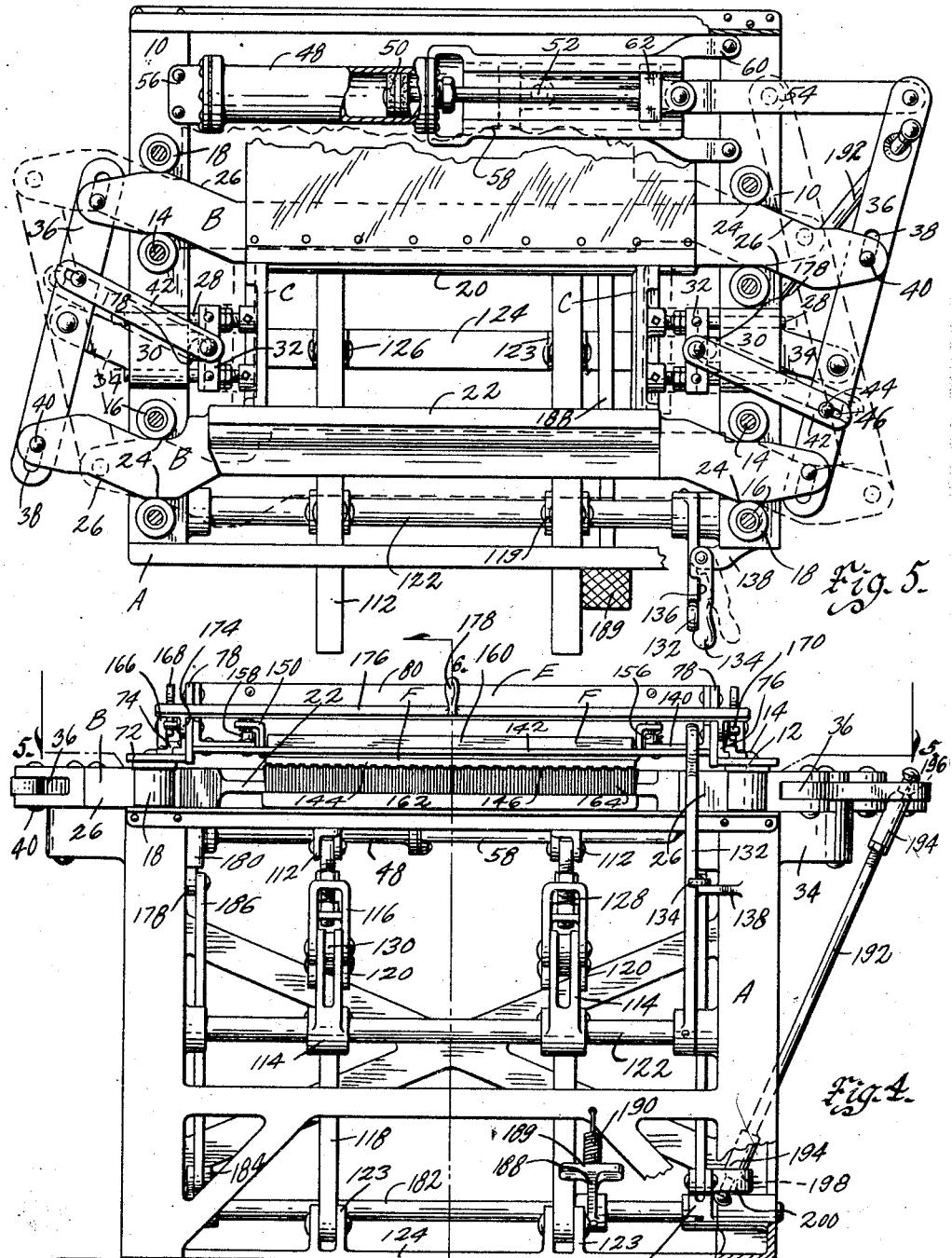

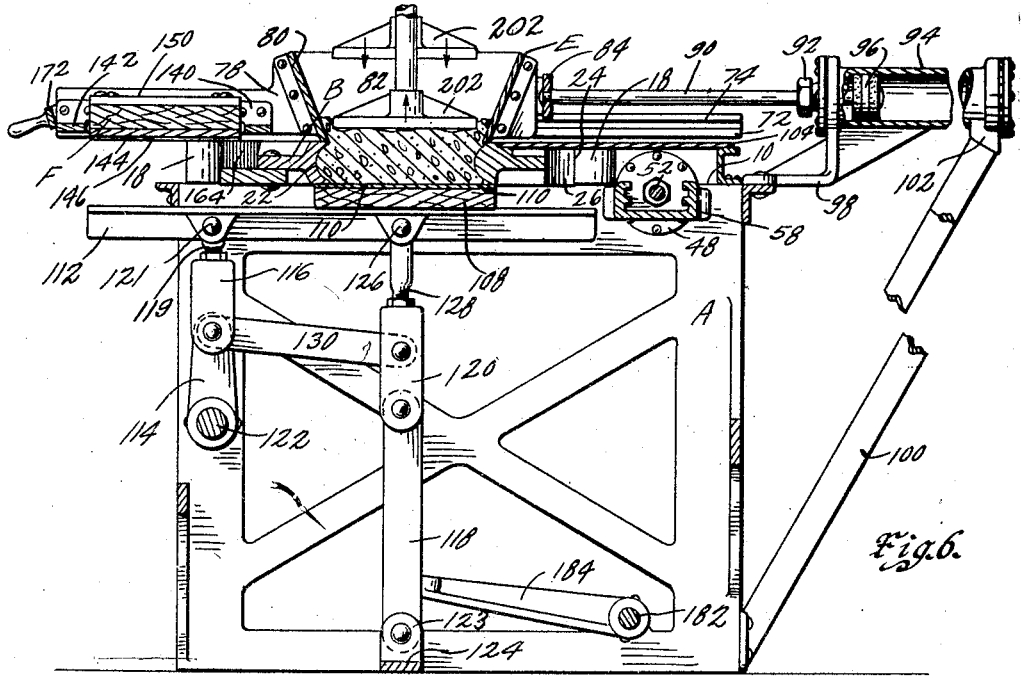
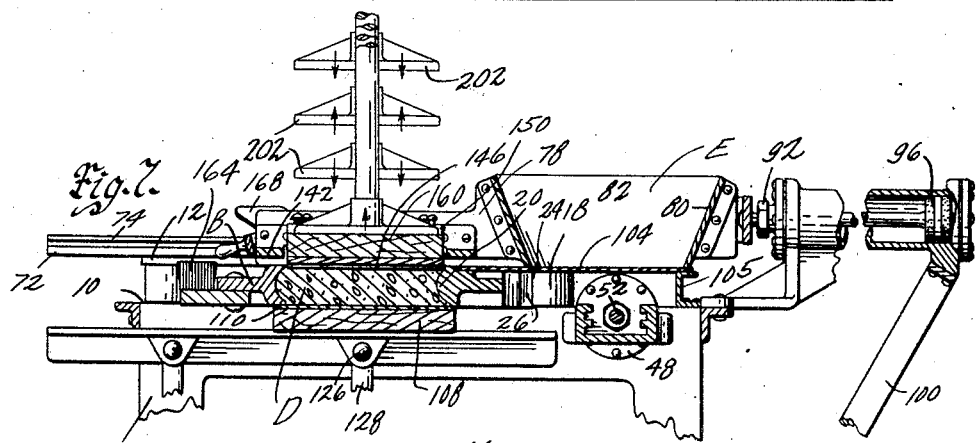
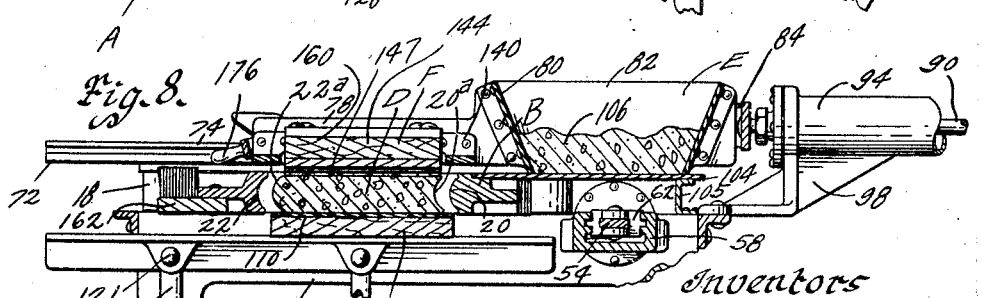

Patented July 16, 1929.

1,721,017

UNITED STATES PATENT OFFICE.

WILLIAM W. GURNEY, OF WINONA, MINNESOTA, AND CLYDE C. WOODY, OF MADISON, WISCONSIN, ASSIGNORS TO MADISON SILO COMPANY, OF MADISON, WISCONSIN.

MACHINE FOR MAKING SILO STAVES.

Application filed June 25, 1928. Serial No. 288,184.

The object of our invention is to provide a machine for making silo staves, the machine being of simple, durable and comparatively inexpensive construction.

Still a further object is to provide a silo stave having a corrugated or roughened surface and to further provide a machine for making such a stave in which means is provided for forming this corrugated or roughened surface on the stave.

More particularly, it is our object to provide a machine including a mold box in which plastic material may be introduced and tamped, and to provide means for roughening the surface of the plastic material after it has been tamped.

Still a further object is to provide a mold box consisting of a removable pallet and movable side and end members in combinations with a hopper adapted to receive a plastic material and transfer such material to the mold box, after which it may be tamped, a corrugated plate being connected with the hopper, so that after the plastic material has been tamped in the mold box, the corrugated plate may be moved to position in contact with the plastic material and may then be tamped down thereagainst for forming a strong silo stave with a corrugated surface.

It may here be mentioned that in the construction of silos, the silo staves are built up into a tubular shaped silo and held assembled together by clamping bands extending around the body of the silo. The silo staves are assembled into a silo in vertical position and the ends and sides of the silo staves are formed with tongues and grooves, whereby mechanically good joints result and it is unnecessary to mortar these joints together. However, the joints are not air tight and the exclusion of air is necessary to the proper construction of a silo. Therefore, the inside of the silo after it has been assembled, is plastered or white-washed with a solution of cement or cement and sand in combination with other water proofing materials, in order to make it water proof and air tight. It is well known that even a pin hole in the side of a silo wall will let air into the ensilage, which will spoil it for a distance of six or eight inches around such a hole.

Besides being spoiled and therefore, useless, this spoiled portion of the ensilage is detrimental when eaten by the horses and cattle. Therefore, the desirability of a perfectly air tight inner surface is obvious. By using the ordinary silo staves, it is difficult to keep the white-wash or water proofing coat on the inside of the silo from running down, since it is of quite thin consistency. We have discovered, however, that if the inner surfaces of the silo staves are roughened or corrugated horizontally, the tendency for the white-wash to run down by gravity, will be considerably reduced and the result is a practical construction whereby the inside of the silo may be efficiently water and air proofed. It is therefore our object to provide a molding machine in which provision is made for corrugating or roughening one side of the silo stave.

In the forming of a roughened surface on molded staves, heretofore, one surface of the mold box has been roughened. The plastic material has then been tamped into the mold box but it has been difficult to successfully remove the stave from the mold box without injuring the roughened surface thereof or the body of the stave itself. It has therefore been our object to provide a machine in which the plastic material is first tamped and then the surface of the stave which is to be roughened is struck off to the proper height by the cutting edge of a movable hopper after which the roughened molding surface is tamped against the stave for impressing a roughened surface thereon which is not easily injured.

Still another object of our invention is to provide fluid operated means for opening and closing the mold box, handling the plastic material used therein for the forming of the staves and moving the roughened molding surface from one position to another.

With these and other objects in view our invention consists in the construction, arrangement and combination of the various parts of our device, whereby the objects contemplated are attained, as hereinafter more fully set forth, pointed out in our claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 is a plan view of our machine for forming silo staves with a roughened surface.

Fig. 2 is a perspective view of a portion of such a stave, showing one surface roughened in corrugated form.

Fig. 3 is a right end elevation of our machine.

Fig. 4 is a front elevation of the same.

Fig. 5 is a detail sectional view on the line 5—5 of Fig. 4, illustrating the movable sides and ends of the mold box and the air operated means for causing such movement, the dotted line position indicating the open position of the side and end members of the mold box.

Fig. 6 is a sectional view on the line 6—6 of Fig. 4, illustrating a plastic material being tamped into the mold box.

Fig. 7 is a similar view of the upper portion of the machine, illustrating the corrugated plate being tamped down against the silo stave.

Fig. 8 is a view similar to Fig. 7, illustrating the side members of the mold box moved away from the stave.

Fig. 9 is a similar view, illustrating the stave in position for being removed from the machine and showing the hopper filled with plastic material for forming the next stave.

Fig. 10 is a sectional view on the lines 10—10 of Fig. 1; and

Fig. 11 is a diagrammatic view, illustrating a means of controlling the air cylinders of our machine.

On the accompanying drawings we have used the reference character A to indicate the supporting framework of our machine. The frame A includes two top members 10 above each of which is mounted two spacer bars 12. Rivets or bolts 14 serve to connect the spacer bars 12 with the top members 10 of the frame A and spacing sleeves 16 are positioned on these bolts between the spacer bars 12 and the members 10. Rollers 18 are rotatably mounted on the spacer sleeves 16.

Our machine includes a mold box consisting of movable side members B and movable end members C, the side members B having molding surfaces 20 and 22. The surface 20 is convex, as clearly shown in Fig. 6 of the drawings and the molding surface 22 is correspondingly concave.

In Fig. 2 of the drawings, the silo stave D formed in our machine has a concave edge 20ª formed by the convex molding surface 20 and has a convex edge 22ª formed by the concave molding surface 22.

The mold box side members B are formed with cam surfaces 24 normally engaged by the rollers 18. The cam surfaces 24 extend longitudinally relative to the side members B. Inclined cam surfaces 26 are also formed on the side members B and the purpose of these surfaces will hereinafter be fully described.

The mold box end members C are secured to pins 28 which extend slidably through bosses 30 formed on the members 10 of the frame A. Connector blocks 32 are adjustably positioned relative to the pins 28 and are adapted when moved, to move the mold box end members C.

Bosses 34 extend from the sides of the supporting frame A and actuating levers 36 are pivoted to these bosses. The levers 36 are provided with slots 38, which in conjunction with pins or the like 40, serve to operatively connect the levers 36 with the ends of the mold box side members B. By means of link connections 42, the end members C are adapted to be actuated by movement of the actuating levers 36. It will be noted that the connection between the links 42 and the levers 36 is by means of pins 44 and slots 46, whereby a lost motion connection is provided.

For actuating the right hand lever 36, and thereby moving the side members B longitudinally and for also actuating the left hand lever 36, which serves to move the left hand member C, we provide a piston 50 arranged in a cylinder 48. The piston 50 is operatively connected by a piston rod 52 and a link 54 to one end of the right hand actuating lever 36.

The cylinder 48 has a bracket 56 secured to one of the members 10 of the frame A and is secured to the other member 10 by a cross head guide member 58 having brackets 60. The piston rod 52 is formed with a cross head 62 guidingly associated with the cross head guide 58.

Referring to Fig. 11, the piston 50 may be caused to move in either direction within the cylinder 48 by means of a four-way control valve 64. For instance, with the valve in the position illustrated in Fig. 11, air or other fluid under pressure enters the inlet 66 and is discharged into the outer end of the cylinder 48 for moving the piston 50 in the direction of the arrow 68. When the valve 64 is in this position, air from the inner end of the cylinder 48 is discharged from the discharge pipe 70. When the valve is turned a quarter turn, air will be introduced into the inner end of the cylinder 48 and discharged from the outer end thereof, whereby the piston 50 will move in a direction opposite to the arrow 68. At an intermediate position of the valve, the air will be completely shut off for preventing any movement of the piston.

Mounted on the spacer bars 12 are guide bars 72. The guide bars 72 are held in position on the spacer bars 12 by the bolts 14. Z-shaped bars 74 are secured to the upper surfaces of the guide bars 72, whereby grooves directed toward each other are provided on each side of the machine.

Angle bars 76 are slidably mounted in these grooves and are secured to hopper supporting plates 78. The hopper referred to is indicated generally, by the reference character E and consists of side plates 80 secured to the supporting plates 78. End plates 82 are provided for the hopper E and are secured to the side plates 80, as clearly illustrated in Fig. 1 of the drawings.

From the construction of the parts just described, it will be obvious that the hopper E is slidably mounted relative to the guide bars 72 and the Z bars 74. For causing the sliding movement of the hopper E and its supporting plates 78, we provide a yoke 84 having its arms pivoted on pins 86 extending from bosses 88 secured to the supporting plates 78. A piston rod 90 is secured to the central portion of the yoke 84 and extends through a packing nut 92 into a cylinder 94.

A piston 96 is positioned within the cylinder 94 and secured to the piston rod 90. The cylinder 94 is supported by a foot 98 and brace bars 100 extending from the back of the frame A to a boss 102 formed on the cylinder 94. The cylinder 94 of course, may be supported in any other suitable manner than the one shown.

A bottom plate 104 is secured to one of the mold box side members B and provides a bottom for the hopper E when the hopper is in its rearmost position, as illustrated in Figs. 7, 8, and 9. In this position, the hopper is adapted to receive a plastic material such as concrete, which material may then be transferred to the space between the mold box members B and C by moving the hopper forwardly to the positions shown in Figs. 1 and 6. In such position, the cement 106 is discharged onto a pallet 108. A channel bar 105 is secured to the frame A for slidably supporting the rear edge of the plate 104.

The pallet 108 is preferably made of wood and formed with a smooth steel face 110. The pallet 108 is supported by angle bars 112 and lever and yoke connections 114, 116, 118, and 120.

The levers 114 are secured to a rock shaft 122. The yokes 116 are connected by rods 119 to pivot pins 121 supported relative to the angles 112. The rods 119 are adjustable relative to the yokes 116.

The levers 118 are pivotally supported between ears 123 formed on a cross bar 124, the ends of which are secured to the frame A. The yokes 120 are adjustably connected to pivot pins 126 by screw threaded rods 128. The adjustment of the rods 119 and 128 relative to the yokes 116 and 120 provides for pallets of various thicknesses and compensates for wear of the pallets.

By means of a link connection 130, the angles 112 may be caused to assume the position illustrated in Fig. 9 by rocking the shaft 122 counter-clockwise. The rocking of the shaft 122 may be manually accomplished by a lever 132 secured thereto. A lock handle 134 having a notch 136 adapted to engage the lever 132 holds the angles 112 in their raised position, shown in Fig. 6. The lock handle 134 is pivoted to a bracket 138 extending from the frame A.

Secured to the supporting plates 78 are L-shaped brackets 140. The brackets 140 are connected by bars 142. Supported in the rectangular opening formed by the brackets 140 and the bars 142 is a corrugated plate structure F. The corrugated plate structure F consists of a plate 144 having a roughened or corrugated lower surface 146. The plate 144 is secured to Z bars 150 which have one of their flanges spaced above the L-shaped brackets 140. Rivets or bolts 152 and 154 serve to hold the plate 144 in a predetermined position relative to the brackets 140. Between the brackets 140 and the Z bars 150 and on the bolts 152, spacer sleeves 156 are positioned, while on the bolts 154, springs 158 are positioned.

It will be noted that the sleeves 156 are somewhat shorter than the space between the Z bars 150 and the brackets 140 when the Z bars are held normally spaced from the brackets by the springs 158, the rivets 152 and 154 serving as limit stops against the action of the springs.

A plank 160 is secured to the upper surface of the plate 144. A cleaning device for the corrugated surface 146 is supported on the front side member B of the mold box. The cleaning device comprises a base 162 and stiff bristles 164, preferably made of steel embedded in the base.

We provide a lock for retaining the hopper E in the position illustrated in Figs. 7, 8, and 9. The lock consists of brackets 166 secured to the guide bars 72 with hook shaped latches 168 pivoted to the brackets 166 and adapted to engage pins 170 extending from the supporting plates 78 of the movable hopper when the hopper is in its rearmost position. The latches 168 are actuated by gravity.

For rendering the latches 168 inoperative, we provide a lifter bar 172 having short arms 174 pivoted on the pins 170. A handle 176 is provided for the operator's convenience in raising the lifter bar 172 to the dotted line position shown in Fig. 3, whereby the latches 168 may be raised from engagement with the pins 170. The hopper E may then be moved forwardly.

The mold box side members B are prevented from moving away from each other by the cam surfaces 24. The mold box end members C are prevented from moving away from each other by slidable lock bars 178. The lock bars 178 are slidably mounted in bearings 180.

For operating the sliding lock bars 178, we provide a rock shaft 182 having arms 184 thereon connected by links 186 to the lock bars 178. A lever 188 is secured to the rock shaft 182 and is provided with a foot pedal 189. A spring 190 serves to hold the foot pedal in raised position.

It is desirable to operate the lock bar 178 from the actuating lever 36 and we provide for such operation by means of a thrust rod 192. The thrust rod 192 is adjustable in length and is provided with ball heads 194 adapted to seat in a socket 196 formed in the lower surface of the right hand actuating lever 36 and a similar socket 198 formed in a lug 200 extending from one of the levers 184. Due to the angular arrangement of the thrust rod 192, it serves to press downwardly on the lever 184 for rocking the rock shaft 182 when the end of the lever 36 to which the link 54 is connected is moved inwardly.

*Practical operation.*

In the operation of our device, the parts first of all, assume the position shown in Fig. 9. In this position, the hopper E is filled with a predetermined amount of concrete 106 mixed comparatively dry. This concrete may either be shoveled in from a mixing box or contained in a supply hopper above the hopper E and discharged through a discharge door into the hopper E.

The piston 96 in the cylinder 94 is operated by a four-way valve in a manner similar to the piston 50 in the cylinder 48. The valve just referred to and the valve 64, of course, would be located at a convenient position for the operator of the machine. The piston 96 is caused to move forwardly, which moves the hopper E from the position on the bottom plate 104 to a position over the pallet 108, as shown in Fig. 6.

This transfers the concrete 106 from the plate 104 to the space between the members B and C of the mold box. An ordinary tamping machine consisting of a plurality of tamper heads 202, which of course, would be assembled in proper operative position relative to the silo stave making machine is then operated for tamping the concrete 106, as clearly illustrated in Fig. 6.

After a few seconds of this tamping operation the tamper heads 202 are raised and the piston 96 is then actuated for moving the hopper E back to position on the plate 104 where it may again be filled with concrete. In moving the hopper E in the manner just described, the corrugated plate 144 moves to position over the pallet 108 and the tamper head 202 may then be used for tamping against the plank 160 for impressing corrugations or a roughened surface on the top of the silo stave D according to the character of the under surface 146 of the plate 144. The plate 144 is tamped and consequently driven downwardly until the Z bars 150 engage the spacer sleeves 166, as shown in dotted lines in Fig. 10, whereupon the silo stave is of proper thickness.

After the tamper heads 202 are removed, as shown in Fig. 8, the silo stave D is ready for removal from the machine. The four-way valve 64 is then actuated for moving the mold box side members B to the dotted line position shown in Fig. 5 and the full line position shown in Fig. 8.

The members B first move longitudinally, due to the cam surfaces 24 and then move diagonally away from the stave D when the cam surfaces 26 engage the rollers 18. During the latter portion of the diagonal movement, the pins 44 will engage the outer ends of the slots 46 in the links 42 and move the end members C away from the silo stave. By initially moving the members B and then the members C, we have eliminated the tendency for collapse of the corners of the stave.

The handle 132 may then be moved forwardly and downwardly for causing the silo stave to assume the position shown in Fig. 9, whereupon, it may conveniently be removed from the machine and another pallet inserted in position for receiving the next silo stave to be made. Just before the end members C are moved away from the silo stave, the thrust rod 192 has moved the rock shaft 194 sufficiently to cause the lock bars 178 to move from their position between the frame A and the connector bars 32 on the pins 28. Instead of the corrugations shown in Fig. 2 on the silo stave D, any type of a roughened surface may be provided by changing the character of the under surface of the plate 144.

We have found that the corrugations need not be very deep, and the plate 144 can be roughened by scarcely more than making tool marks on its under surface by a shaper. By mounting the steel bristles 164 in the position shown in the sectional Figs. 6, 7, 8, and 9, the corrugated surface 146 of the plate 144 is efficiently cleaned each time it is moved from one of its positions to another.

Some changes may be made in the construction and arrangement of the parts of our device without departing from the real spirit and purpose of our invention, and it is our intention to cover by our claims, any modified forms of structure or use of mechanical equivalents, which may be reasonably included within their scope.

We claim as our invention:

1. In a machine of the class described, a mold box, a pallet forming a bottom for said box, means for introducing a plastic material into said box, a corrugated plate and means for primarily tamping said material against said pallet and secondarily tamping said corrugated plate against said plastic material.

2. In a machine of the class described, a mold box, a pallet forming a bottom for said box, means for introducing a plastic material into said box, a corrugated plate movably mounted and means for primarily tamping said material against said pallet and moving said corrugated plate to position on said plastic material, and secondarily tamping said corrugated plate thereagainst.

3. In a machine of the class described, a mold box comprising movable side and end members, a pallet forming a bottom for said box, means for introducing a plastic material into said box, a corrugated plate and mechanisms for tamping said plastic material against said pallet, moving said corrugated plate to contact with said plastic material, tamping said corrugated plate thereagainst, moving the corrugated plate away from the tamped surface and then moving said side members longitudinally and then diagonally away from each other and secondarily moving said end members away from each other.

4. In a silo stave machine, a pallet, a mold box comprising movable side members, and movable end members, a hopper, having a bottom plate, said hopper being movable from a position on said bottom plate to a position over said mold box and a corrugated plate associated with said hopper and movable therewith, said corrugated plate assuming a position over said mold box when said hopper is in position over said bottom plate.

5. In a silo stave machine, a pallet, a mold box comprising movable side members, and movable end members, a hopper, having a bottom plate, said hopper being movable from a position on said bottom plate to a position over said mold box and a corrugated plate associated with said hopper and movable therewith, said corrugated plate assuming a position over said mold box when said hopper is in position over said bottom plate, and a series of bristles arranged to frictionally engage said corrugated plate as it moves with said hopper.

6. In a silo stave machine, a pallet, a mold box comprising movable side members, and movable end members, a hopper, having a bottom plate, said hopper being movable from a position on said bottom plate to a position over said mold box and a corrugated plate associated with said hopper and movable therewith, said corrugated plate assuming a position over said mold box when said hopper is in position over said bottom plate, and a series of bristles arranged to frictionally engage said corrugated plate as it moves with said hopper, said bristles being mounted on one of said movable mold box members whereby it is movable therewith.

7. In a machine of the character disclosed, a pallet, a movable hopper, a corrugated plate movable therewith, a bottom plate for said hopper, said hopper being adapted to receive a plastic material when in a position on said bottom plate and being adapted to discharge such material onto said pallet when in a position thereover, said corrugated plate assuming a position over said pallet when said hopper is in a position on said bottom plate.

8. In a machine of the character disclosed, a pallet, a movable hopper, a corrugated plate movable therewith, a bottom plate for said hopper, said hopper being adapted to receive a plastic material when in a position on said bottom plate and being adapted to discharge such material onto said pallet when in a position thereover, said corrugated plate assuming a position over said pallet when said hopper is in a position on said bottom plate, said plastic material being adapted to be tamped when on said pallet with the hopper in position thereover and the corrugated plate adapted to be tamped against said plastic material when said hopper is on said bottom plate.

9. In a silo stave making machine, a mold box for holding plastic material adapted to be tamped therein, a plate having a roughened surface, said plate being adapted to be tamped against said plastic material, and means for cleaning said roughened plate.

10. In a silo stave making machine, a mold box comprising a pallet and movable side and end members, a movable hopper and roughened plate, movable to two positions, fluid operated means for moving said side and end members and fluid operated means for moving said hopper and roughened plate.

11. In a silo stave making machine, a mold box comprising a pallet and movable side and end members, and air operated means for moving said side members longitudinally and then away from each other and for moving said end members away from each other during the last part of the movement of the side members.

12. In a silo stave making machine, means for tamping plastic material to form a silo stave and means tamped against said stave for forming a roughened surface thereon.

WILLIAM W. GURNEY.
CLYDE C. WOODY.